FACSIMILE-SCANNER WITH A.G.C. OF OUTPUT SIGNAL BY MULTIPLICATION OF LOW AND HIGH DEFINITION SIGNALS

Filed June 22, 1961 3 Sheets-Sheet 1

WILLIAM E. EVANS, JR.
HOWARD E. MURPHY
INVENTORS.

BY Lyon & Lyon
ATTORNEYS

WILLIAM E. EVANS, JR.
HOWARD E. MURPHY
INVENTORS

BY Lyon & Lyon
ATTORNEYS

Feb. 16, 1965 W. E. EVANS, JR., ETAL 3,170,032

FACSIMILE-SCANNER WITH A.G.C. OF OUTPUT SIGNAL BY MULTIPLICATION OF LOW AND HIGH DEFINITION SIGNALS

Filed June 22, 1961 3 Sheets-Sheet 3

WILLIAM E. EVANS, JR.
HOWARD E. MURPHY
INVENTORS

BY Lyon & Lyon

ATTORNEYS

United States Patent Office 3,170,032

Patented Feb. 16, 1965

3,170,032

FACSIMILE-SCANNER WITH A.G.C. OF OUTPUT SIGNAL BY MULTIPLICATION OF LOW AND HIGH DEFINITION SIGNALS

William E. Evans, Jr., Los Altos Hills, and Howard E. Murphy, Redwood City, Calif., assignors to A. B. Dick Company, Chicago, Ill., a corporation of Illinois Filed June 22, 1961, Ser. No. 118,986
5 Claims. (Cl. 178—7.1)

This invention relates to systems for scanning documents for generating electrical signals representative of the information written on said documents and, more particularly, to improvements therein.

Many varieties of optical-electronic facsimile systems are known. The scanner employed within these systems performs the important function of converting optical information stored upon an original document into electrical (video) signals suitable for transmission to and operation of an output printer. Many of these scanners must be preset to "read" graphic material written upon a given paper stock, since the optical reflectance of paper varies widely because of differences in color, finish, etc., of their surfaces. These differences in "background reflectance" make it difficult to maintain adequate contrast in the video-signal output of the scanner, because of the limited dynamic range of the video amplifier, signal-to-noise considerations, etc.

An object of this invention is to provide a scanner which will automatically adjust its gain so that a relatively high-contrast, relatively noise-free signal is delivered for any paper stock whose reflectance falls within very broad limits.

Another object of this invention is to provide a scanner which does not require manual readjustment between runs with different paper, since gain adjustment is automatic.

Yet another object of this invention is to provide a scanner which is much more tolerant of lighting or electrical component variations than has been possible heretofore.

Yet another object of this invention is to provide a scanner which automatically compensates for differences in contrast between the written data and the paper on which it is written, to produce signals from which an excellent copy may be made.

Yet another object of this invention is to provide a novel scanning arrangement which automatically compensates for differences in background reflectance between various paper stocks employed to provide a video signal from which an excellent copy can be made.

Still another object of this invention is the provision of a new and useful method of automatic-gain control by modulation of the voltage applied to a dynode of a photomultiplier tube.

Still another object of the present invention is the provision of a novel and improved scanning system.

These and other objects of the invention are achieved in an arrangement wherein a document is scanned by a system employing a two-aperture scanner, with one of the apertures being much smaller than the other. Accordingly, one of the photocells which is positioned to receive light passing through the smaller of these apertures provides a high-definition signal, suitable for reproducing typewritten material, while another photocell positioned behind the large aperture produces a low-definition signal proportional to the average background reflectance of the original. The electrical output of the second photocell is used as a fast-acting automatic-gain signal for the output of the first photocell, so that, in essence, the two signals are multiplied together. This results in increased contrast of the darker areas of the original, and, in addition, compensates for variations in lighting intensity or for power line, or other modulations in the light source.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figures 1, 2:
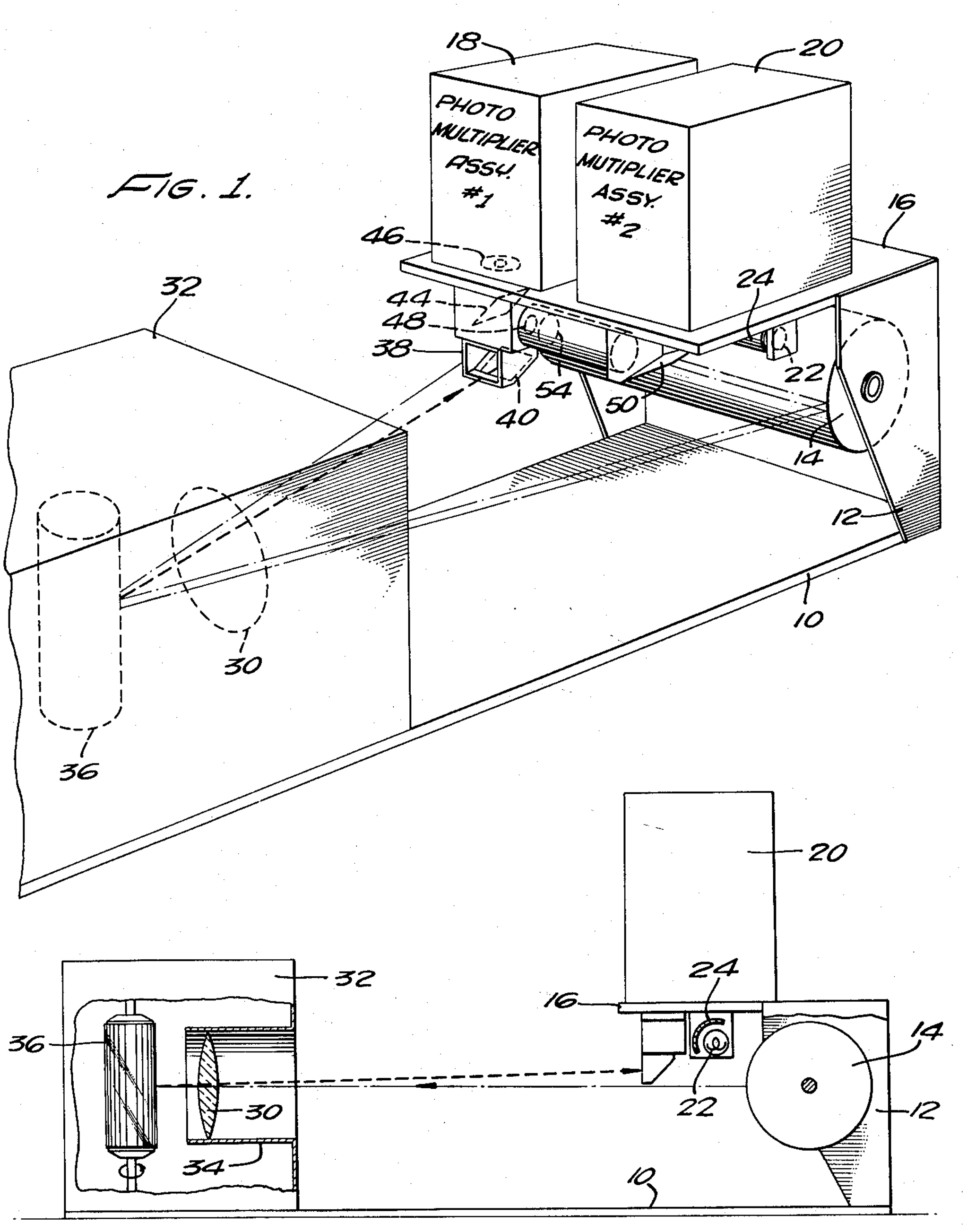
FIGURE 1 is an isometric view of the arrangement of the scanner in accordance with this invention.
FIGURE 2 is a side view of the scanner in accordance with this invention.

Referring to FIGURE 1, there may be seen an isometric view of a scanner in accordance with this invention. It will include a base 10, at one side of which there is attached a support member 12. A scanning drum 14 is rotatably supported by said support member 12 and is driven or rotated by a motor, not shown. The vertical support member 12 holds a platform member 16 above the scanning drum 14. Supported on the platform member 16 are a first and second photomultiplier assembly, respectively 18, 20. The platform member 16 also holds a fluorescent lamp 22 and reflector 24, which illuminate a portion of the drum which it is desired to scan.

The document to be scanned is slid over the drum from the side opposite to the side supported by the support member 12. It is held on the drum by means of clips or other well-known mechanism, which will not be shown here.

FIGURE 2 is a side view of the invention, and reference will be made thereto in addition to FIGURE 1. Light from a line on the document on the drum is collected by a lens 30, which is supported in a lens housing 32. The lens housing includes a lens holder 34, which supports the lens 30. Behind the lens is a reflecting mirror 36, which comprises twenty mirrors mounted on the periphery of a cylinder which is continually rotated. In the embodiment of the invention, a 3¼″ lens was employed for collecting the reflected light from the scanning drum. The rotating, many-sided mirror 36 behind the lens effectively reflects the image of the drum which is focussed thereon by the lens back through the lens into the collecting tube 38, which is associated with the photomultiplier assemblies.

The path of the light from the drum to the many-sided mirror and back to the collecting tube 38 is represented by the dotted and dashed lines and arrows in FIGURES 1 and 2.

Within the collecting tube there is positioned a prism 40, which is represented by the dotted lines. This prism totally reflects the light which passes through the aperture collecting tube in a vertical direction, so that it strikes a beam-splitting mirror 44, also represented by dotted lines. The beam-splitting mirror 44 divides the light into a primary and secondary component, which are at right angles to each other. The primary beam continues upward through the mirror and is brought to focus on a small aperture plate 46, which, in an embodiment of the invention, was a 0.005″ thick shim stock plate which contained a 0.008″ diameter circular aperture. The photomultiplier is positioned on the other side of the aperture to receive the light passing therethrough. The secondary beam is reflected to the right, and it passes through an 0.150 aperture in a plate 48, which is known as the large aperture plate. Concentricity of the two scanning apertures is assured by providing an adjustment for the position of the 0.008" aperture. The light which passes through the large aperture plate 48 strikes the second reflecting prism 50 and is directed upward, to be sensed by the second photomultiplier 20. Thus, the twenty-sided mirror in each complete rotation effectively passes the image of an iluminated line on the drum twenty times across the two apertures.

Figure 3:
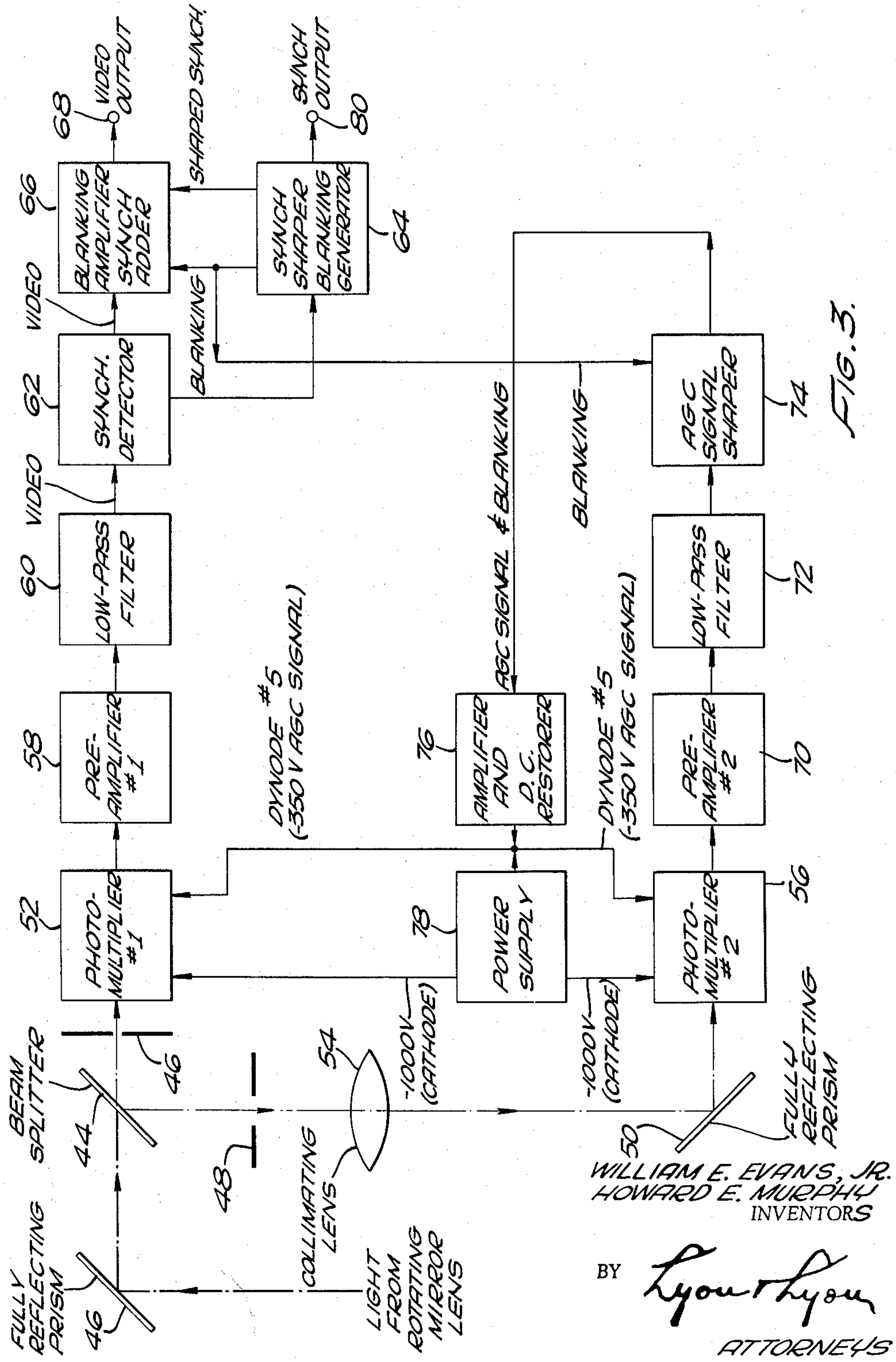
FIGURE 3 is a functional block diagram of the scanner in accordance with this invention.

Attention is now directed to FIGURE 3, which comprises a functional block diagram of the invention. The path of the light from the rotating mirror and lens, as shown in FIGURE 3, first strikes the fully reflecting prism, which then alters the light path so that it will strike the beam-splitting mirror 44. A portion of the light passes directly through the mirror to impinge upon the small-aperture plate 46 and to pass through the 0.008" aperture to the first photomultiplier 52. The secondary light which is reflected by the mirror passes through the 0.150 aperture in the large-aperture plate, after which it is collected by a collimating lens 54 and then reflected by the prism 50 onto a second photomultiplier 56.

The output of the first photomultiplier 52 is applied to a preamplifier 58, and, after some preliminary amplification, the signal is applied to a low-pass filter 60, which reduces the higher frequency noise output of the preamplifier. The output from the low-pass filter 60 is applied to a sync-signal detector 62. A synchronizing signal may be inserted in the original signal picked up by the phototube 52 by positioning a whiter-than-white object or light at one side of the scanning drum, so that each time one of the twenty mirrors begins to scan a line a high-intensity signal is provided. The sync output of the sync detector is applied to the sync-shaper-and-blanking generator 64, and the video output of the sync detector is applied to a blanking-amplifier-and-sync adder 66. The sync-shaper-and-blanking generator inserts the requisite synchronizing and blanking signals in the video signal so that the output of the blanking-amplifier-and-sync adder 66, which is applied to the video output terminal 68, consists of the composite video signal ready for transmission or reproduction.

The output of the second photomultiplier tube 56 is applied to a second preamplifier 70 for preliminary amplification. The output of the preamplifier 70 is then applied to a low-pass filter 72. The output of the low-pass filter 72 is applied to an automatic-gain-control-signal shaper 74, to which there is also added blanking signals from the sync-shaper-and-blanking generator 64. The automatic-gain-control-signal shaper 74 thus provides an output comprising automatic-gain-control signals and blanking signals. These are applied to the amplifier and D.S. restorer 76. The output of the amplifier and D.C. restorer is added to a D.C. voltage derived from the power supply 78, which is to be applied to the fifth dynode of the photomultiplier tubes. The power supply 78 supplies operating potential to the photomultipliers 52, 56. This combined voltage is then applied to the fifth dynode of the photomultiplier 52 and the photomultiplier 56. Another output derived from the sync-shaper-and-blanking generator 64 is applied to an output terminal 80. This comprises synchronizing signal output.

The circuits represented by the rectangles in FIGURE 3 are all circuits which are well known in the television art and which may be found described in detail in any good text on television. The circuit shown in FIGURE 3 feeds back a signal derived from the secondary light beam, which is a low-definition signal proportional to the average density of the area surrounding the spot, for the purpose of increasing or decreasing the output of the photomultiplier 52, as well as for controlling the level of the output of the photomultiplier 56. With the exception of the signal being fed back in negative-feedback fashion to the fifth dynode of the photomultipliers 52 and 56, the photomultipliers are biased in conventional fashion with their cathodes at a negative voltage, and with their anodes approximately at ground potential.

Fast-acting automatic-gain-control action is achieved by modulating the voltage applied to the fifth dynode of the photomultipliers from the power supply 78. These photomultipliers are the type having an anode, a cathode, and a plurality of dynodes in between for amplifying the electrical signal, which results by shining light on the cathode. These photomultipliers may be, for example, of the type designated as 6199 by Radio Corporation of America. The gain of this tube is maximum when the fifth dynode is held at a D.C. potential which is one-half of the cathode-to-anode potential. However, the gain of the tube changes rapidly as the fifth dynode voltage is raised or lowered. A 20 db, or ten-to-one decrease in sensitivity of the photomultiplier tube, may be obtained by either increasing or decreasing the fifth dynode voltage by approximately eight percent of the cathode potential. In other words, if the cathode voltage is −1000 volts, a fifth dynode voltage of either −420 or −580 will result in the sensitivity of the photomultiplier tube being decreased by 20 db below its value at a fifth dynode potential of −500 volts.

Accordingly, by adding the signal derived from the illumination of the large aperture of the fifth dynode potential and by applying this combined potential to the fifth dynode of the photomultiplier 52, the small-aperture signal is multipled by the large-aperture signal. This is a true multiplication process, since essentially none of the multiplier signal is added to the multiplicand, and the performance of the system does not depend upon maintenance of a delicately balanced system. The blanking signal is added to the automatic-gain-control signal for the purpose of blanking the large-aperture signal during horizontal-retrace time, so that at the start of each line the photomultipliers are in a high-gain position and the synchronizing pulse accordingly may be readily detected.

Figure 4:
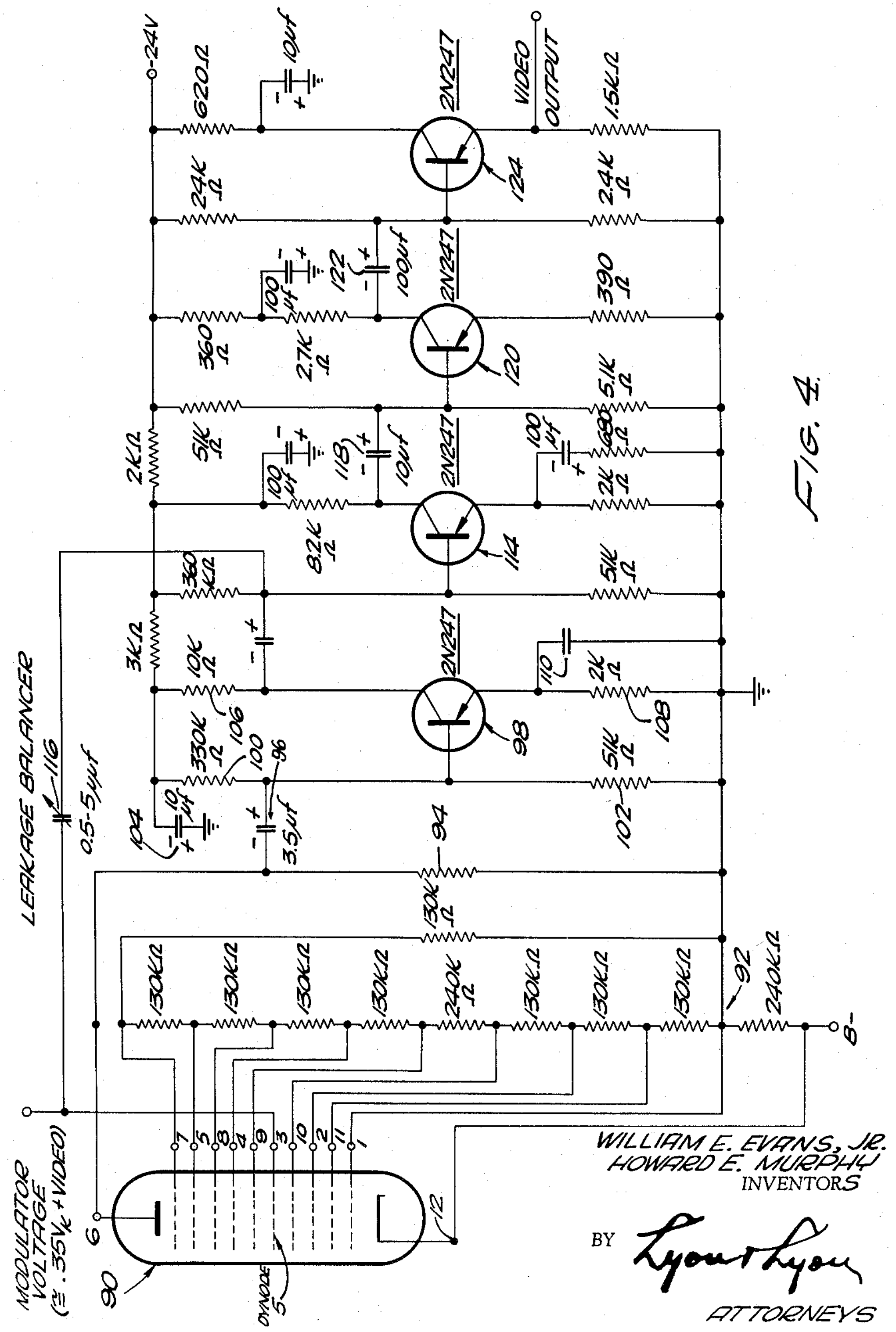
FIGURE 4 is a circuit diagram of a photomultiplier and preamplifier in accordance with this invention.

FIGURE 4 is a circuit diagram of a photomultiplier and preamplifier circuit suitable for use in the embodiment of the invention. It should be noted that FIGURE 4 is representative of the circuitry required for photomultiplier 52 and preamplifier 58, as well as photomultiplier 56 and preamplifier 70. The circuit includes the photomultiplier tube 90. The operating potential for the cathode and all of the dynodes except the fifth dynode is provided by a voltage divider 92 which is connected between B— and ground. The third pin of the photomultiplier tube 90 is connected to a terminal 94, to which is applied a voltage from the power supply which is approximately 0.35 times that between the cathode and anode and also the automatic-gain-control signal and blanking signal. The potential derived from the power supply in an embodiment of the invention which was built was on the order of 350 volts. The third pin on the photomultiplier tube is connected to the fifth dynode within the tube. The anode of the photomultiplier, which is connected to the sixth pin of the tube, is connected to a junction to which a resistor 94 and a capacitor 96 are connected. The other side of resistor 94 is connected to ground. The other side of capacitor 96 is connected to the base of a PNP transistor 98.

A bias potential is applied to the base of this transistor 98 by connecting the base to the junction of two resistors 100, 102, which are connected across the operating-potential source. A filter capacitor 104 is connected across the operating-potential source. A resistor 106 connects the collector of transistor 98 to the operating-potential source, and another resistor 108 connects the emitter of transistor 98 to ground. A capacitor 110 bypasses the resistor 108 for alternating current.

The output of transistor 98 is connected through a capacitor 112 to the base of the PNP transistor 114. This output is also fed back through a variable capacitor 116 to the fifth dynode of the photomultiplier 90. The purpose of the variable capacitor 116 is to feed back sufficient signal 180° out of phase to cancel any high-frequency leakage signal which may be coupled into the preamplifier input by stray wiring capacity and inter-electrode capacitance within the photomultipliers. The output of transistor 114 is coupled through a capacitor 118 to another amplifying transistor 120. The output of transistor 120 is coupled through capacitor 122 to a transistor 124. The emitter of transistor 124 has an output load resistance connected between it and ground. The output from transistor 124 is derived from its emitter. This is the output which is connected to the low-pass filter in the circuit shown in FIGURE 3.

There has been shown and described herein a novel and useful scanning arrangement for deriving video signals from a document whereby variations in color, reflectance, or contrast between the data which is written on the document and the document itself are compensated for automatically. Furthermore, by this system automatic compensation is provided for variations in power supply and/or illumination. While specific data is given in connection with the sizes of the large- and small-aperture dimensions of the embodiment of the invention, etc., this should not be considered as a limitation on the invention, but merely as exemplary thereof. It is therefore intended that the scope of the invention shall be determined by the claims, and not by the specifics of this description of the invention.

We claim:

1. Apparatus for deriving a video signal representative of data written upon a document comprising a first and second flat member each having an aperture therethrough, the aperture in said first flat member being small relative to the aperture in said second flat member, scanning means for successively deriving light from incremental areas of said document and for directing the light from each incremental area upon both of said apertures, first and second photomultiplier means respectively positioned opposite the apertures in said first and second flat members for converting the light passing therethrough into first and second electrical signals, means for applying only said second electrical signals to said first and second photomultiplier means for controlling the gain thereof solely responsive thereto, and means for deriving an output signal from said first photomultiplier means.

2. In a system for scanning a document having information written thereon wherein the light reflected from successive incremental areas of said document varies in accordance with the information which is written on the document as well as the background reflectance of the document, the improvement comprising means for deriving from the light from each incremental area high-definition signals representative of specific light variations, means for deriving simultaneously from each light area low-definition signals proportional to the average background reflectance of the incremental area, means for multiplying said high-definition signal with said low-definition signal to provide a product signal, control means operative in response to signals applied thereto for controlling the amplitude of said high-definition signal, and means for applying said product signal to said control means for controlling the amplitude of said high definition signal responsive to said product signal.

3. In a system as recited in claim 2 wherein said means for multiplying said high-definition signal with said low definition includes a photomultiplier tube having a dynode, means for applying a voltage to said dynode, and means for modulating the voltage applied to said dynode with said low-definition signals.

4. In a facimile scanning system wherein light reflected from incremental areas of a document are converted to electrical signals, the improvement comprising first and second flat members each having an aperture, the aperture of said first flat member being small when compared to the aperture of said second flat member, first and second photomultiplier tubes of the type having an anode and cathode and a plurality of separate dynodes for amplifying the electrical signals generated by light falling upon said cathode, means for directing the light reflected from each incremental area simultaneously upon both apertures of said first and second flat members, means for positioning said first photomultiplier tube for receiving the light passing through the aperture in said first flat member, means for positioning said second photomultiplier tube for receiving the light passing through said aperture in said second flat member, means for applying operating potentials to said first and second photomultiplier tubes, means for amplifying the output of said second photomultiplier tube, and means for applying said amplified second photomultiplier tube output to one of the dynodes in said first and second photomultiplier tubes for compensating automatically for variations in contrast in the light reflected from incremental areas of said document.

5. In a system wherein it is desired to obtain an electrical signal representing the product of two light modulations, apparatus comprising means for converting one of said two light modulations to a first electrical signal, a photomultiplier tube upon the photocathode of which said second light modulation is directed, said photomultiplier tube having a dynode, means to apply operating potential to said photomultiplier tube including said dynode, and means for applying said first electrical signal to said dynode to modulate the voltage thereon whereby the output of said photomultiplier tube is an electrical signal representing said product.

References Cited in the file of this patent

UNITED STATES PATENTS

| | | |
|---|---|---|
| 2,198,233 | Snyder | Apr. 23, 1940 |
| 2,768,309 | Phillips | Oct. 23, 1956 |
| 2,892,887 | Hell | June 30, 1959 |
| 2,962,548 | Taudt | Nov. 29, 1960 |
| 2,972,012 | Farber | Feb. 14, 1961 |